United States Patent
Liu et al.

(10) Patent No.: US 12,386,544 B2
(45) Date of Patent: Aug. 12, 2025

(54) SERVER DATA ERASING METHOD, APPARATUS AND DEVICE, AND READABLE STORAGE MEDIUM

(71) Applicant: SUZHOU METABRAIN INTELLIGENT TECHNOLOGY CO., LTD., Jiangsu (CN)

(72) Inventors: Chengping Liu, Jiangsu (CN); Yufeng Zhang, Jiangsu (CN); Feng Guo, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/865,269

(22) PCT Filed: Mar. 3, 2023

(86) PCT No.: PCT/CN2023/079560
§ 371 (c)(1),
(2) Date: Nov. 12, 2024

(87) PCT Pub. No.: WO2024/077847
PCT Pub. Date: Apr. 18, 2024

(65) Prior Publication Data
US 2025/0110656 A1   Apr. 3, 2025

(30) Foreign Application Priority Data
Oct. 10, 2022   (CN) .................. 202211231505.X (51) Int. Cl.
G06F 3/06   (2006.01)

(52) U.S. Cl.
CPC .......... *G06F 3/0652* (2013.01); *G06F 3/0604* (2013.01); *G06F 3/0679* (2013.01)

(58) Field of Classification Search
CPC ..... G06F 3/0652; G06F 3/0604; G06F 3/0679
See application file for complete search history.

(56) References Cited

U.S. PATENT DOCUMENTS

| 6,757,842 B2 * | 6/2004 | Harari ................. G11C 11/5635 |
| | | 714/6.32 |
| 11,543,992 B2 * | 1/2023 | Bhat ....................... G06F 21/60 |

(Continued)

FOREIGN PATENT DOCUMENTS

| CN | 205028663 U | 2/2016 |
| CN | 114115724 A | 3/2022 |

(Continued)

*Primary Examiner* — Edward J Dudek, Jr.
(74) *Attorney, Agent, or Firm* — IPro, PLLC (57) ABSTRACT

Provided are a method, apparatus and device for erasing server data. The method includes: receiving a target data erasure strategy sent from a human-machine interaction device; in response to the target data erasure strategy being a fast erasure strategy, erasing a specified type of data in a hard disk drive of a server to be processed; and in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed.

18 Claims, 2 Drawing Sheets

(56) References Cited

U.S. PATENT DOCUMENTS

| | | | |
|---|---|---|---|
| 2006/0117136 A1 | 6/2006 | Tran et al. | |
| 2010/0318810 A1* | 12/2010 | Strom | G06F 21/80 713/190 |
| 2011/0242590 A1* | 10/2011 | Takahashi | H04N 1/32358 358/1.15 |
| 2014/0136577 A1* | 5/2014 | Cherel | G06F 21/6227 707/813 |
| 2015/0106562 A1* | 4/2015 | Helmer | G06F 11/00 711/114 |
| 2019/0121571 A1* | 4/2019 | Wahla | G06F 3/0679 |
| 2019/0303029 A1* | 10/2019 | Brown | G06F 3/0634 |
| 2020/0183595 A1* | 6/2020 | Goda | G06F 3/1204 |
| 2021/0311650 A1* | 10/2021 | Tsu | G06F 16/162 |
| 2022/0137850 A1* | 5/2022 | Boddu | G06F 3/0689 711/112 |

FOREIGN PATENT DOCUMENTS

| | | |
|---|---|---|
| CN | 114816269 A | 7/2022 |
| CN | 115309346 A | 11/2022 |

\* cited by examiner

SERVER DATA ERASING METHOD, APPARATUS AND DEVICE, AND READABLE STORAGE MEDIUM

CROSS-REFERENCE TO RELATED APPLICATIONS

This application claims priority to Chinese Patent Application No. 202211231505.X, entitled "METHOD, APPARATUS, AND DEVICE FOR ERASING SERVER DATA, AND READABLE STORAGE MEDIUM", filed on Oct. 10, 2022 with the China National Intellectual Property Administration, the entire contents of which are incorporated herein by reference.

TECHNICAL FIELD

The disclosure relates to the field of computer security, and in particular to a method for erasing server data. The disclosure also relates to an apparatus and a device for erasing server data, and a readable storage medium.

BACKGROUND

The server in a data center records key, sensitive and confidential data of a company or a department. The disposal or inter-departmental use of the server both will involve the disposal of server data. In the related art, when being erased, the server data is usually manually erased to the maximum extent, which is inefficient. In addition, various situations need to be considered when erasing the server data, maximumly erasing data without considering the actual situation may lead to problems of erasing useful data and damaging sectors of the hard disk.

SUMMARY

An object of the disclosure is to provide a method for erasing server data. Another object of the disclosure is to provide an apparatus for erasing server data, a device for erasing server data and a readable storage medium.

In order to solve the above-mentioned technical problem, the disclosure provides a method for erasing server data, applied to a server, including:
  receiving a target data erasure strategy sent from a human-machine interaction device;
  in response to the target data erasure strategy being a fast erasure strategy, erasing a specified type of data in a hard disk drive of a server to be processed; and
  in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed.

In some embodiments of the disclosure, after receiving the target data erasure strategy sent from the human-machine interaction device, the method for erasing server data further includes:
  in response to the target data erasure strategy being a delisting erasure strategy, erasing all the hard disk drive data in the server to be processed, and erasing the data other than the hard disk drive data of the server to be processed.

In some embodiments of the disclosure, the step of in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed further includes:
  in response to the target data erasure strategy being the safe erasure strategy, determining whether the hard disk drive alarm exists in the server to be processed;
  in response to the hard disk drive alarm existing in the server to be processed, performing data erasure on the part of the hard disk drive of the server to be processed except the sector to be mapped, and erasing the data other than the hard disk drive data of the server to be processed; and
  in response to no hard disk drive alarm existing in the server to be processed, erasing all the hard disk drive data of the server to be processed, and erasing the data other than the hard disk drive data of the server to be processed.

In some embodiments of the disclosure, the erasing the data other than the hard disk drive data of the server to be processed further includes:
  deleting usage records of firmware in the server to be processed and/or deleting data in a persistent memory (PMEM).

In some embodiments of the disclosure, the step of performing data erasure on the part of the hard disk drive of the server to be processed except the sector to be mapped, and erasing the data other than the hard disk drive data of the server to be processed, further includes:
  counting starting and ending positions of all sectors to be mapped in the hard disk drive of the server to be processed;
  constructing an erasure isolation table of the sectors to be mapped according to the starting and ending positions counted;
  performing data erasure on sectors other than the sectors that are in the erasure isolation table in the hard disk drive of the server to be processed; and
  erasing the data other than the hard disk drive data of the server to be processed.

In some embodiments of the disclosure, the method for erasing server data further includes:
  during performing data erasure, controlling a prompter to prompt a current data erasure progress of the server to be processed.

In some embodiments of the disclosure, the erasing all the hard disk drive data in the server to be processed further includes:
  invoking an array card tool to erase all the data on a hard disk drive connected to the array card; and
  erasing all the data of a hard disk drive directly connected to the server to be processed by overwriting a random number.

In some embodiments of the disclosure, data erasure actions are performed for multiple times for both the hard disk drive connected to the array card and the hard disk drive directly connected to the server.

In some embodiments of the disclosure, the specified type of data further includes header data and a file allocation table of a disk volume.

In some embodiments of the disclosure, all the data erasure strategies are stored in a memory card; the memory card is fixed in a card slot on a mainboard of the server by means of plug-in mounting.

In some embodiments of the disclosure, the memory card is embedded with a specified operating system;

the memory card is in a quiesced state when being not activated;

the receiving a target data erasure strategy sent from a human-machine interaction device further includes: in response to an instruction for activating the memory card, booting up the specified operating system in the memory card and executing the step of receiving the target data erasure strategy sent from the human-machine interaction device.

In some embodiments of the disclosure, the method for erasing server data further includes:

controlling a card slot where the memory card is located to be powered off in response to not receiving the instruction for activating the memory card; and controlling the card slot where the memory card is located to be powered on in response to receiving the instruction for activating the memory card.

In order to solve the above-mentioned technical problem, the disclosure provides an apparatus for erasing server data, applied to a server, including:

a reception module configured for receiving a target data erasure strategy sent from a human-machine interaction device;

a first execution module configured for, in response to the target data erasure strategy being a fast erasure strategy, erasing a specified type of data in a hard disk drive of a server to be processed; and a second execution module configured for, in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed.

In order to solve the above-mentioned technical problem, the disclosure further provides a device for erasing server data, including:

a memory configured for storing a computer program; and a processor configured for implementing the steps of the method for erasing server data when executing the computer program.

In order to solve the above-mentioned technical problem, the disclosure further provides a non-transient readable storage medium storing a computer program that, when executed by a processor, implements the steps of the method for erasing server data.

BRIEF DESCRIPTION OF THE DRAWINGS

In order to more clearly illustrate embodiments of the present disclosure, figures that are required to describe the related art and the embodiments will be briefly introduced below. Apparently, the figures described below illustrate merely some embodiments of the present disclosure, and those skilled in the art may obtain other figures according to these figures without paying creative effort.

DETAILED DESCRIPTION OF THE EMBODIMENTS

The core of the disclosure is to provide a method for erasing server data, according to which, the work efficiency can be improved by performing data erasure based on a solidified data erasure strategy; a fast erasure strategy is used to erase only necessary data of a specified type in a hard disk drive of the server to be processed, thereby improving the work efficiency and avoiding physical damages to the hard disk drive caused by erasing all the data on the disk; when a safe erasure strategy is performed and a hard disk drive alarm exists in the server, the data erasure on a sector to be mapped can be avoided for the security of the hardware. Another core of the disclosure is to provide an apparatus and a device for erasing server data, and a readable storage medium, according to which, the work efficiency can be improved by performing data erasure based on a solidified data erasure strategy; a fast erasure strategy is used to erase only necessary data of a specified type in a hard disk drive of the server to be processed, thereby improving the work efficiency and avoiding physical damages to the hard disk drive caused by erasing all the data on the disk; when a safe erasure strategy is performed and a hard disk drive alarm exists in the server, the data erasure on a sector to be mapped can be avoided for the security of the hardware.

In order to make the object, technical solutions, and advantages of the embodiments of the application clearer, the technical solutions in the embodiments of the application will be described clearly and completely in conjunction with the accompanying drawings in the embodiments of the disclosure. Apparently, the embodiments described are only a part of the embodiments of the present disclosure, rather than all the embodiments. Based on the embodiments in the present disclosure, all other embodiments obtained by those skilled in the art without involving any creative effort should be within the scope of protection of the present disclosure.

Figure 1:
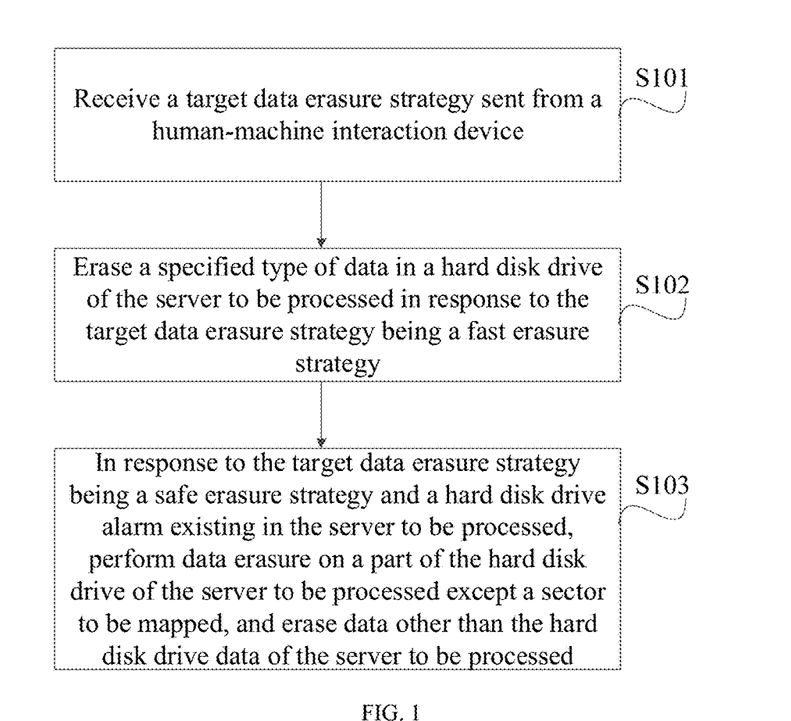
FIG. 1 is a schematic diagram illustrating a flow of a method for erasing server data provided by the disclosure.

With reference to FIG. 1 that is a schematic diagram illustrating a flow of a method for erasing server data provided by the disclosure, the method for erasing server data includes steps described below.

At S101, a target data erasure strategy sent from a human-machine interface device is received.

The background art of the disclosure is further introduced first. Currently, more and more devices are included in a data center, and the shelving and use, the unshelving and disposal and the inter-departmental use of devices have become a normal operation. The server in the data center records key, sensitive and confidential data of a company or a department. The unshelving and disposal or inter-departmental use of the server will involve the disposal of the data in the server. In addition, a current server includes various components such as a hard disk drive, a memory, and a firmware, and thus the server has the problem of large capacity. A matter of concern is become how to quickly and safely destroy the server data with one click, and achieve the purpose of protecting the server, improving efficiency, and saving time and cost while ensuring data security.

In the current processing method for erasing server data, a simple and rough method is often used without performing a targeted data deletion according to the actual scenario and the status of the server. Firstly, in the server restart phase, hard disk data is erased through reorganizing RAID (Redundant Arrays of Independent Disks). Secondly, by entering the server out-of-band management system BMC (Baseboard Manager Controller), the logs of other firmware of the server are deleted via the system. In addition, a direct-connected disk of the server (a hard disk which is directly linked to a mainboard of the server via a data line without being connected through an array card) and a persistent memory (PMEM) may have a risk of including data that can not be deleted, and the data needs to be manually erased through other means by an operation and maintenance engineer, which is time-consuming and laborious. At present, most data centers adopts the above-mentioned method to wipe data. Based on the existing technology, the technical problem that is urgent to be solved is how to use the existing technical means to efficiently and accurately maintain server data information so as to ensure the data security and device security of the server and save manpower costs while improving the operation and maintenance efficiency of the server.

In view of the above-mentioned technical problems in the background art, to erase the server data with one click, in the disclosure, a data erasure strategy is pre-designed first. By executing the data erasure strategy, the whole data erasure work of the server to be processed can be completed, which directly improves the working efficiency and reduces the manpower cost. Moreover, there are many data erasure scenarios of the server, and the states of the servers are also different, which may require different data erasure actions. Therefore, in order to deal with various scenarios and requirements, a plurality of data erasure strategies are pre-set in the disclosure so as to meet different data erasure requirements of the server.

The quantity of data erasure strategies can be set autonomously according to requirements, which is not limited in the embodiments of the disclosure.

The pre-set data erasure strategies mentioned in the embodiments of the disclosure may be stored in various locations. For example, the data erasure strategies may be stored on a mobile storage device such as a USB flash drive or a mobile hard disk drive, through which the data erasure may be performed on a server to be processed. Alternatively, the data erasure strategies may also be stored on a fixed storage device of each server. In this case, the data erasure can be performed on the server without using a dedicated mobile storage device, thereby improving working efficiency. The embodiments of the disclosure are not limited thereto.

When data erasure is required to be performed on a server, a staff may first determine a data erasure strategy applicable to the server that is currently to be processed, that is, a target data erasure strategy is determined. Then, a strategy selection instruction for selecting the target data erasure strategy may be sent via a human-machine interaction device so as to wipe the server data efficiently and accurately.

The human-machine interaction device may be of various types, which may be self-contained in the server, or may be an additionally connected human-machine interaction device. The type of the human-machine interaction device is limited in the embodiments of the disclosure herein.

At S102, when the target data erasure strategy is a fast erasure strategy, a specified type of data in a hard disk drive of the server to be processed is erased.

In many use scenarios, for example, when the devices are used in rotation between the upstream and downstream of the same company or the same department, since it is a business process of data sharing or making data public, the level for safe erasure requirement of data is relatively low, and it is not necessary to erase all the data of the disk, that is, only some data in the hard disk drive needs to be erased. Therefore, in the embodiment of the disclosure, a fast erasure strategy is designed for such a scenario. As specified in the fast erasure strategy, only a specified type of data in the hard disk drive is to be erased. Therefore, when the fast erasure strategy is used for data erasure, only the specified type of data in the hard disk drive of the server to be processed is erased. The usage records and data of other hardware in the server are not deleted, so as to achieve the purpose of fast and efficient device circulation and usage.

The specified type may be set autonomously, which is not limited in the embodiments of the disclosure herein.

At S103, when the target data erasure strategy is a safe erasure strategy and a hard disk drive alarm exists in the server to be processed, data erasure is performed on a part of the hard disk drive of the server to be processed except a sector to be mapped, and data other than hard disk drive data of the server to be processed is erased.

Different from the scenario corresponding to the fast erasure strategy, a kind of scenario has a higher level of requirements for the security of the data, for such a scenario, the data of the server needs to be deleted as far as possible while ensuring the stability of the server. For example, in a scenario where devices of the server are scheduled and used across companies or departments, the data of the server needs to be deleted as far as possible while ensuring the stability of the server, which is not limited in the embodiments of the disclosure herein.

The sector to be mapped is an unstable disk sector. Although the sector to be mapped is currently available, merely a read error in the sector will not result in immediate remapping, and the remapping will only occur when writing fails. The sector will be marked as unstable due to the read error. If the sector is subsequently read and written successfully, the sector will become normal. That is to say, if the data erasure is blindly performed on the sector to be mapped by overwriting a random number or the like, the sector will become a damaged sector and lose data read and write capability. Therefore, in order to protect such sectors, in the embodiment of the disclosure, the data erasure on sectors to be mapped can be avoided in the process of erasing all the hard disk drive data, thereby achieving hardware security and improving the stability of the server.

Data other than the hard disk drive data can be erased directly, so as to completely erase the hard disk drive data.

According to the method for erasing server data provided by the present disclosure, firstly, the work efficiency can be improved by performing data erasure based on a solidified data erasure strategy; secondly, considering that the data security hazard is small and a large amount of data can be shared when a server is circulated and used in a same company or a same department, a fast erasure strategy is provided in the present disclosure, so that only necessary data of the specified type in the hard disk drive of the server to be processed is erased, thereby improving the work efficiency and avoiding physical damages to the hard disk drive caused by erasing all the data on the disk; thirdly, further considering that when the safe erasure strategy is performed and a hard disk drive alarm exists in the server, a sector to be mapped may be damaged due to performing data erasure action on the sector, accordingly, in this case, the data erasure on the sector to be mapped can be avoided for the security of the hardware.

In some embodiments of the disclosure, after the target data erasure strategy sent from the human-machine interaction device is received, the method for erasing server data further includes:

in response to the target data erasure strategy being a delisting erasure strategy, erasing all the hard disk drive data in the server to be processed, and erasing data other than the hard disk drive data of the server to be processed.

The embodiments of the disclosure provide another data erasure strategy, namely, the delisting erasure strategy which is mainly applicable to the processing of unshelving devices. Since the devices are no longer used later, and the level of the security requirements for data is high. In this case, the stability of the server does not need to be considered, and the data of the server needs to be maximumly and thoroughly deleted to ensure a comprehensive destruction of the data of the server. Therefore, in this case, the hard disk drive data in the server to be processed may be erased thoroughly, and the data of the server to be processed other than hard disk drive data may be erased, so that all the data of the server can be erased thoroughly in an efficient manner.

Of course, in addition to the three types of data erasure strategies provided by the embodiments of the disclosure, the data erasure strategies may be of other various types, and the embodiments of the disclosure are not limited herein.

In some embodiments of the disclosure, the step, in which, when the target data erasure strategy is a safe erasure strategy and a hard disk drive alarm exists in the server to be processed, data erasure is performed on the part of the hard disk drive of the server to be processed except the sector to be mapped, and data other than the hard disk drive data of the server to be processed is erased, includes the following steps:
  in response to the target data erasure strategy being the safe erasure strategy, determining whether a hard disk drive alarm exists in the server to be processed;
  in response to determining that the hard disk drive alarm exists in the server to be processed, performing data erasure on a part of the hard disk drive of the server to be processed except a sector to be mapped, and erasing data other than the hard disk drive data of the server to be processed; and
  in response to determining that no hard disk drive alarm exists in the server to be processed, erasing all the hard disk drive data in the server to be processed, and erasing the data other than the hard disk drive data of the server to be processed.

Since the server may identify whether it has a hard disk drive alarm by itself, in order to improve the degree of automation and reduce manpower costs, when the safe erasure strategy is executed in the embodiment of the disclosure, the server to be processed can automatically determine whether a hard disk drive alarm exists in the server. For a server with the hard disk drive alarm, the data erasure may be performed on the part of the hard disk drive of the server to be processed except the sector to be mapped, and data other than hard disk drive data of the server to be processed is erased. For a server without the hard disk drive alarm, the same action as that for the delisting erasure strategy can be performed, that is, all the hard disk drive data in the server to be processed is erased, and the data other than the hard disk drive data of the server to be processed is erased.

A register where hard disk drive alarm information is located may be actively read so as to determine whether the hard disk drive alarm exists in the server to be processed. The embodiment of the disclosure is not limited thereto.

In some embodiments of the disclosure, the data other than the hard disk drive data of the server to be processed is erased by:
  deleting firmware usage records in the server to be processed and/or deleting data in a persistent memory (PMEM).

In addition to the hard disk drive data, the server generates a large number of firmware usage records during operation, and the data in a PMEM (Persistent Memory) of the server also needs to be deleted. Accordingly, in the embodiment of the disclosure, the firmware usage records in the server to be processed and/or the data in the persistent memory (PMEM) can be deleted.

Of course, in addition to the above two types of data, the data other than the hard disk drive data of the server to be erased may also include other types, which is not limited in the embodiment of the disclosure.

In some embodiments of the disclosure, the step, in which data erasure is performed on a part of the hard disk of the server to be processed except the sector to be mapped, and data other than hard disk drive data of the server to be processed is erased, includes:
  counting starting and ending positions of all sectors to be mapped in the hard disk drive of the server to be processed;
  constructing an erasure isolation table of the sectors to be mapped according to the starting and ending positions counted;
  performing data erasure on sectors that are not in the erasure isolation table in the hard disk drive of the server to be processed; and
  erasing the data other than the hard disk drive data of the server to be processed.

In order to accurately perform data erasure on "sectors that are not in the erasure isolation table", in the embodiment of the disclosure, when performing data erasure, starting and ending positions of all sectors to be mapped in the hard disk drive of the server to be processed are counted first, and an erasure isolation table of the sectors to be mapped is constructed according to the starting and ending positions counted, and then data erasure is performed on the sectors that are not in the erasure isolation table in the hard disk drive of the server to be processed. In this way, the accuracy of data erasure is improved, and the security of the hardware is further ensured.

Of course, in addition to this manner, the data erasure on the part of the hard disk drive of the server to be processed other than the sector to be mapped can also be performed in other forms, which is not limited in the embodiment of the disclosure.

In some embodiments of the disclosure, the method for erasing server data further includes:
  during performing data erasure, controlling a prompter to prompt a current data erasure progress of the server to be processed.

In the process of controlling, by the staff, the server to be processed to perform data erasure, in order to facilitate the staff to monitor the work progress, during the data erasure in the embodiment of the disclosure, a prompter is controlled to prompt the current data erasure progress of the server to be processed. In this way, the staff may learn the progress of the data erasure in real time, improving the user experience and working efficiency.

In order to accurately display a percentage of the work progress, a total amount of all the data to be erased may be calculated in advance before the data erasure is performed, and the amount of data that has been erased may be calculated in real time. The percentage progress of the data erasure may be calculated according to the above two data amount.

Here, the prompter may be of various types. For example, it may be a display and the like, which is not limited in the embodiments of the disclosure.

In some embodiments of the disclosure, the step, in which all the hard disk drive data in the server to be processed is erased, includes:

invoking an array card tool to erase all the data on a hard disk drive connected to the array card; and
  erasing, by overwriting a random number, all the data of a hard disk drive that is directly connected to the server to be processed.

The hard disk drives in the server are divided into two control modes, one of which is a hard disk drive connected to the array card, and the other is a hard disk drive directly connected to the mainboard of the server. For the hard disk drive connected to the array card, in the embodiment of the disclosure, an array card tool may be directly invoked to erase all the data of the hard disk drive connected to the array card. For the hard disk drive directly connected to the server, all the data of the hard disk drive directly connected to the server to be processed may be erased by means of overwriting a random number. These data erasure modes of the two types of hard disk drives are relatively simple and efficient, which is beneficial to further improve the working efficiency.

Of course, in addition to the two specific methods, an overall data erasure of the hard disk drive in the server to be processed may also be performed in other methods, which is not limited in the embodiments of the disclosure.

In some embodiments of the disclosure, data erasure actions are performed multiple times for both the hard disk drive connected to the array card and the hard disk drive directly connected to the server.

In order to ensure the hard disk drive data to be thoroughly erased and prevent the erased data from being recovered subsequently, in the embodiment of the disclosure, data erasure actions may be performed multiple times on both the hard disk drive connected to the array card and the hard disk drive directly connected to the server, complying with relevant privacy standards. The quantity of times here may be set autonomously. For example, it may be set as three times, etc., which is not limited in the embodiment of the disclosure herein.

In some embodiments of the disclosure, the specified type of data includes:

header data and a file allocation table of a disk volume.
  when the devices are used in rotation between the upstream and downstream of the same company or the same department, since it is a business process of data sharing or making data public, the level for safe erasure requirement of data is relatively low, and it is not necessary to erase all the data of the disk. Therefore, in the embodiment of the disclosure, a fast erasure strategy is designed for such a scenario. When the fast erasure strategy is used for data erasure, for the hard disk drive connected to the array card, a fast reorganization technique of the array card is used, so that the header data and the file allocation table of the disk volume are deleted, and the data of the hard disk drive is not deleted; for the hard disk drive directly connected to the sever, the header data and the file allocation table of the disk volume are also deleted, and the hard disk drive data is not deleted. For other hardware in the server, the usage records and data are not deleted, thereby achieving the purpose of fast and efficient device circulation and usage.

Even if the device is used in rotation within the same department or the same company, the hard disk partition may be deleted quickly by deleting the header data and the file allocation table of the disk volume, thereby deleting the disk data quickly while preventing damages caused by an overall erase of the hard disk drive. Therefore, in the embodiment of the disclosure, the header data of the disk volume of the hard disk and the file allocation table may be erased in the above scenario.

Of course, in addition to the header data of the disk volume and the file allocation table, the specified type of data may be other specific types, which is not limited in the embodiments of the disclosure herein.

In some embodiments of the disclosure, all the data erasure strategies are stored in a memory card.

The memory card is fixed in a card slot of the mainboard of the server by means of plug-in mounting.

By storing the data erasure strategies in the memory card fixed in the card slot of the mainboard of the server by means of plug-in mounting, the data erasure strategies can always accompany the server, so that when data erasure is performed on the server, there is no need to temporarily use a mobile memory to perform data erasure, thereby improving the working efficiency.

The memory card may be of various types, for example, a TF card (Trans-flash Card, later renamed Micro SD Card, a multifunctional memory card), etc. The embodiments of the disclosure are not limited thereto.

Figure 2:
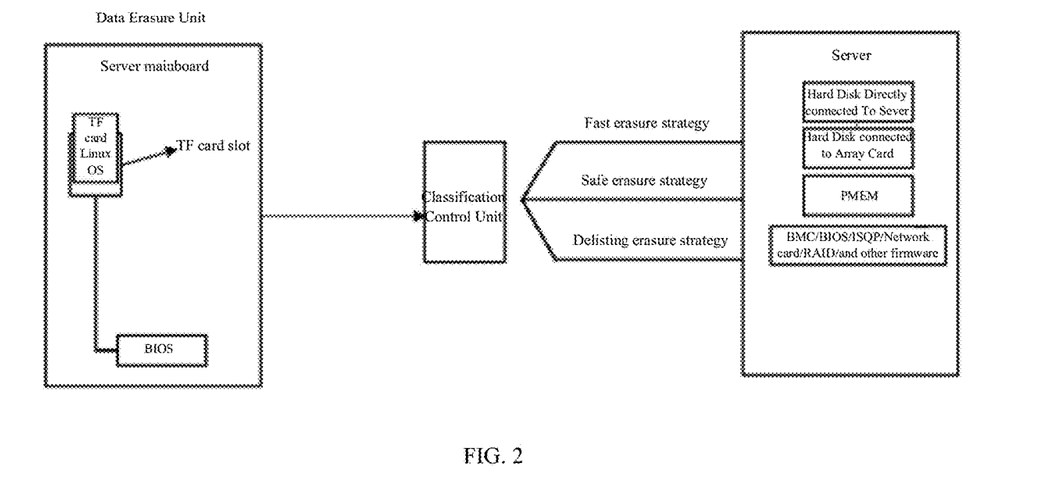
FIG. 2 is a schematic diagram illustrating a flow of another method for erasing server data provided by the disclosure.

In order to better explain the embodiments of the disclosure, reference is made to FIG. 2. FIG. 2 is a schematic diagram illustrating a flow of another method for erasing server data provided in the disclosure. In some embodiments of the disclosure, the memory card is embedded with a specified operating system.

The memory card is in a quiesced state when it is not activated.

The step, in which a target data erasure strategy sent from a human-machine interaction device is received, includes:

in response to an instruction for activating the memory card, booting up the specified operating system in the memory card and executing the step in which the target data erasure strategy sent from the human-machine interaction device is received.

In order to make the memory card invisible under the user's OS operating system during the normal use phase of the server, and avoid occupying the user's system disc symbols, in the embodiments of the disclosure, the memory card can be set to be in a quiesced state when being not activated, and a specified operating system is embedded in the memory card. Then, when the data erasure is required, the memory card may be activated by a pre-set activation mode. When an instruction for activating the memory card is sent by the pre-set activation mode, BIOS (Basic Input Output System) may start the specified operating system in the memory card and execute the step in which the target data erasure strategy sent from the human-machine interaction device is received, thereby improving the user experience.

The specified operating system may be of various types, for example, a Linux operating system and the like, which is not limited in the embodiments of the disclosure.

In FIG. 2, the hardware includes the mainboard of the server, and a TF card slot, a TF card and a BIOS arranged on the mainboard. During the start-up of the server, the BIOS may activate an operating system in the TF card to start up when receiving an activation instruction (for example, an F7 key instruction), thereby executing the data erasure. The ISQP in FIG. 2 is an abbreviation of server stand-alone management software I Server Quick Provisioning, where I refers to a producer of the software. The architecture of the method may include a data erasure unit and a classification control unit as below.

The main function of the data erasure unit is achieved by the TF card on which a Linux kernel operating system is embed. The data erasure unit can only be booted when activated by the BIOS system. Usually, the data erasure unit is in a quiesced state, and the TF card is not visible under the user OS system, so as to avoid occupying the user's system card. Only after being activated by means of a shortcut key such as F7 during the BIOS starting process, the server will load the Linux system on the TF card and start the system.
  a) The basic hardware of the system includes a TF card slot on the mainboard of the server and a removable TF card that is convenient to be integrated into the mainboard of the server, so that the update of the software on the TF may be completed very conveniently, and the operation and maintenance efficiency can be improved. Moreover, the removable TF card module may be selected and matched as needed, which is beneficial to reducing the cost of the server of the user;
  b) The BIOS system of the server is used to perform unified control. The TF card slot is powered off in the quiesced period, so that the TF card is disabled, and it is not visible under the system, thereby not occupying the user's software resources, such as system disc symbols. In order to be activated, the TF card slot is powered on, and the TF card is visible and supports starting the server from the Linux system on the TF, so as to perform data erasure operations.
  c) On the Linux system, the hard disk drive data of the server and usage records may be erased by one click, which achieves the integrated operation of the whole machine without troublesomely distinguishing the hardware category of the server and manually deleting each hardware category by category or one by one. Therefore, the data erasure time of the server can be effectively saved, and the efficiency is improved by more than 300%. The integrated operation includes:
  erasing data of a hard disk drive connected to an array card by using an array card tool;
  erasing data of a hard disk drive directly connected to the server by overwriting a random number;
  deleting usage records of the firmware of the server such as the BMC chip, the network card, the RAID card by calling an interface of the firmware; and
  deleting data of the persistent memory (PMEM) by means of command line script.

The main function of the classification control unit is to select different data erasure strategies for users according to different scenarios while data erasure being performed on the server, so that the server is prevented from being damaged due to data erasure operations, the waste of time caused by excessive erasure is avoided, and resources are saved for users more reasonably. According to the data accumulation of actual operations of users, more reasonable operations are divided into three types of scenarios: the fast erasure strategy, the safe erasure strategy, and the delisting erasure strategy.

In some embodiments of the disclosure, the method for erasing server data further includes:
  controlling a card slot where the memory card is located to be powered off in response to not receiving the instruction for activating the memory card; and
  controlling the card slot where the memory card is located to be powered on in response to receiving the instruction for activating the memory card.

The memory card itself does not need electric energy when it is in the quiesced state. Therefore, in order to save electric energy, in the embodiment of the disclosure, the server may control the card slot where the memory card is located to be powered off when the instruction for activating the memory card is not received, and control the card slot where the memory card is located to be powered on when the instruction for activating the memory card is received. In this way, the electric energy is saved as much as possible without affecting the normal operation of the memory card.

Figure 3:
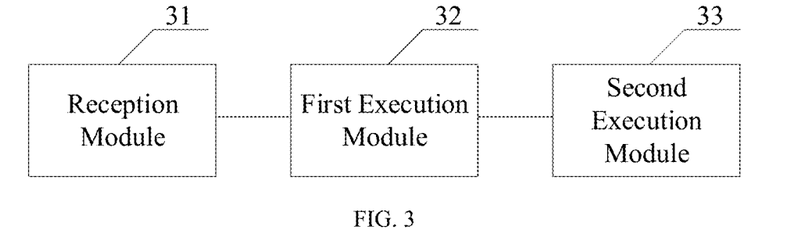
FIG. 3 is a schematic structural diagram illustrating an apparatus for erasing server data provided by the disclosure.

With reference to FIG. 3, FIG. 3 is a schematic structural diagram illustrating an apparatus for erasing server data provided in the disclosure. The apparatus for erasing server data is applied to a server and includes:
  a reception module 31 configured for receiving a target data erasure strategy sent from a human-machine interaction device;
  a first execution module 32 configured for, in response to the target data erasure strategy being a fast erasure strategy, erasing a specified type of data in a hard disk drive of a server to be processed; and
  a second execution module 33 configured for, in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed.

According to the apparatus for erasing server data provided by the disclosure, firstly, the work efficiency can be improved by performing data erasure based on a solidified data erasure strategy; secondly, considering that the data security hazard is small and a large amount of data can be shared when a server is circulated and used in a same company or a same department, a fast erasure strategy is provided in the present disclosure, so that only necessary data of the specified type in the hard disk drive of the server to be processed is erased, thereby improving the work efficiency and avoiding physical damages to the hard disk drive caused by erasing all the data on the disk; thirdly, further considering that when the safe erasure strategy is performed and a hard disk drive alarm exists in the server, a sector to be mapped may be damaged due to performing data erasure on the sector, accordingly, in this case, the data erasure on the sector to be mapped can be avoided for the security of the hardware.

In some embodiments of the disclosure, the apparatus for erasing server data further includes:
  a third execution module configured for, in response to the target data erasure strategy being a delisting erasure strategy, erasing all the hard disk drive data of the server to be processed, and erasing data other than hard disk drive data of the server to be processed.

In some embodiments of the disclosure, the second execution module includes a determination module, a first execution sub-module and a second execution sub-module.

The determination module is configured for: determining whether a hard disk drive alarm exists in the server to be processed in response to the target data erasure strategy being the safe erasure strategy; in response to determining that the hard disk drive alarm exists in the server to be processed, triggering a first execution sub-module; and in response to determining that the hard disk drive alarm does not exist in the server to be processed, triggering a second execution sub-module.

The first execution sub-module is configured for performing data erasure on the part of the hard disk drive of the server to be processed except the sector to be mapped, and erasing the data other than hard disk drive data of the server to be processed.

The second execution sub-module is configured for erasing all the hard disk drive data of the server to be processed, and erasing the data other than hard disk drive data of the server to be processed.

In some embodiments of the disclosure, the erasing the data other than hard disk drive data of the server to be processed includes:

deleting usage records of firmware in the server to be processed and/or deleting data in a persistent memory (PMEM).

In some embodiments of the disclosure, the first execution sub-module includes:

a counting module configured for counting starting and ending positions of all sectors to be mapped in the hard disk drive of the server to be processed;

an isolation table construction module configured for constructing an erasure isolation table of the sectors to be mapped according to the starting and ending positions counted;

a first action module configured for erasing data from sectors other than that are in the erasure isolation table in the hard disk drive of the server to be processed; and a second action module configured for erasing the data other than hard disk drive data of the server to be processed.

In some embodiments of the disclosure, the apparatus for erasing server data further includes:

a control module for, during the data erasure, controlling a prompter to prompt a current data erasure progress of the server to be processed.

In some embodiments of the disclosure, the erasing all the hard disk drive data of the server to be processed includes:

invoking an array card tool to erase all the data on a hard disk drive connected to the array card; and erasing, by overwriting a random number, all the data of a hard disk drive that is directly connected to the server to be processed In some embodiments of the disclosure, data erasure actions are performed multiple times for both the hard disk drive connected to the array card and the hard disk drive directly connected to the server.

In some embodiments of the disclosure, the specified type of data includes:

header data and a file allocation table of a disk volume.

In some embodiments of the disclosure, all the data erasure strategies are stored in a memory card.

Herein, the memory card is fixed in a card slot of a mainboard of the server by means of plug-in mounting.

In some embodiments of the disclosure, the memory card is embedded with a specified operating system.

The memory card is in a quiesced state when it is not activated.

The reception module is configured for:

in response to an instruction for activating the memory card, booting up the specified operating system in the memory card and executing the step of receiving a target data erasure strategy sent from the human-machine interaction device.

In some embodiments of the disclosure, the apparatus for erasing server data further includes:

a power-off control module configured for controlling a card slot where the memory card is located to be powered off in response to not receiving the instruction for activating the memory card; and a power-on control module configured for controlling the card slot where the memory card is located to be powered on in response to receiving the instruction for activating the memory card.

For a description of the apparatus for erasing data of the server provided by the embodiments of the disclosure, reference is made to the aforementioned embodiments of the method for erasing server data, which are not described in detail herein.

Figure 4:
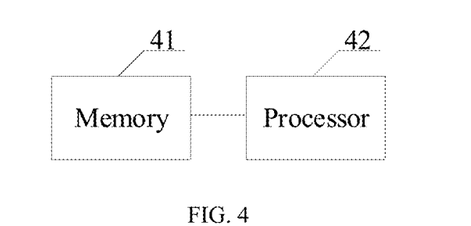
FIG. 4 is a schematic structural diagram illustrating a device for erasing server data provided by the disclosure.

With reference to FIG. 4, FIG. 4 is a schematic diagram illustrating a device for erasing server data provided in the disclosure. The device is applied to a server and includes:

a memory 41 configured for storing a computer program; and a processor 42 configured for executing the computer program to implement steps of the method for erasing server data described in the previous embodiments.

The memory includes a non-transient storage medium, and an internal memory. The non-transient storage medium is stored with an operating system and computer-readable instructions. The internal memory provides an environment for operation of the operating system and the computer-readable instructions in the non-transient storage medium. When the processor executes the computer program stored in the memory, the following steps may be implemented: receiving a target data erasure strategy sent from a human-machine interaction device; in response to the target data erasure strategy being a fast erasure strategy, erasing a specified type of data in a hard disk drive of the server to be processed; in response to the target data erasure strategy being a safe erasure strategy and a hard disk drive alarm existing in the server to be processed, performing data erasure on a part of the hard disk drive of the server to be processed except the sector to be mapped, and erasing data other than hard disk drive data of the server to be processed.

According to the device for erasing server data provided by the disclosure, firstly, the work efficiency can be improved by performing data erasure based on a solidified data erasure strategy; secondly, considering that the data security hazard is small and a large amount of data can be shared when a server is circulated and used in a same company or a same department, a fast erasure strategy is provided in the present disclosure, so that only necessary data of the specified type in the hard disk drive of the server to be processed is erased, thereby improving the work efficiency and avoiding physical damages to the hard disk drive caused by erasing all the data on the disk; thirdly, further considering that when the safe erasure strategy is performed and a hard disk drive alarm exists in the server, a sector to be mapped may be damaged due to performing data erasure on the sector, accordingly, in this case, the data erasure on the sector to be mapped can be avoided for the security of the hardware.

In some embodiments of the disclosure, the processor may execute a computer subroutine stored in the memory to implement the following steps: in response to the target data erasure strategy being the delisting erasure strategy, erasing all the hard disk drive data in the server to be processed, and erasing data other than hard disk drive data of the server to be processed.

In some embodiments of the disclosure, the processor may execute a computer subroutine stored in the memory to implement the following steps: in response to the target data erasure strategy being the safe erasure strategy, determining whether a hard disk drive alarm exists in the server to be processed; if so, performing data erasure on a part of the hard disk of the server to be processed except a sector to be mapped, and erasing data other than hard disk drive data of the server to be processed; and if not, erasing all the hard disk data in the server to be processed, and erasing data other than hard disk drive data of the server to be processed.

In some embodiments of the disclosure, the processor may execute a computer subroutine stored in the memory to implement the following steps: deleting usage records of firmware in the server to be processed and/or deleting data in a persistent memory (PMEM).

In some embodiments of the disclosure, the processor may execute a computer subroutine stored in the memory to implement the following steps: counting starting and ending positions of all sectors to be mapped in the hard disk drive of the server to be processed; constructing an erasure isolation table of the sectors to be mapped according to the starting and ending positions counted; performing data erasure on sectors that are not in the erasure isolation table in the hard disk drive of the server to be processed; and erasing data other than hard disk drive data of the server to be processed.

In some embodiments of the disclosure, the processor may execute a computer subroutine stored in the memory to implement the following steps: during the data erasure, controlling a prompter to prompt a current data erasure progress of the server to be processed.

In some embodiments of the disclosure, the processor may execute a computer subroutine stored in the memory to implement the following steps: invoking an array card tool to erase all the data on the hard disk drive connected to the array card; and erasing all the data on the hard disk directly connected to the server to be processed by overwriting a random number.

In some embodiments of the disclosure, the processor may execute a computer subroutine stored in the memory to implement the following steps: performing data erasure actions multiple times for both the hard disk drive connected to the array card and the hard disk drive directly connected to the sever.

In some embodiments of the disclosure, the processor may execute a computer subroutine stored in the memory to implement the following steps: in response to an instruction for activating the memory card, booting up the specified operating system in the memory card and executing the step of receiving the target data erasure strategy sent from the human-machine interaction device.

In some embodiments of the disclosure, the processor may execute a computer subroutine stored in the memory to implement the following steps: controlling a card slot where the memory card is located to be powered off in response to not receiving the instruction for activating the memory card; and controlling the card slot where the memory card is located to be powered on in response to receiving the instruction for activating the memory card.

For a description of the device for erasing data of the server provided by the embodiments of the disclosure, reference is made to the aforementioned embodiments of the method for erasing server data, which are not described in detail herein.

The disclosure also provides a non-transient readable storage medium storing a computer program that, when executed by a processor, implements the steps of the method for erasing server data described in the previous embodiments.

For a description of the non-transient readable storage medium provided by the embodiments of the disclosure, reference is made to the aforementioned embodiments of the method for erasing server data, which are not described in detail herein.

The various embodiments in the specification are described in a progressive manner, with each embodiment focusing on the differences from the other embodiments. For the same or similar parts between the embodiments, please refer to each other. Regarding the apparatus disclosed in the embodiments, since it corresponds to the method disclosed in the embodiments, it is described relatively simply, and the relevant parts can be referred to in the method section. It should also be noted that in the specification, relational terms such as "first" and "second" are used only to distinguish one entity or operation from another, and do not necessarily require or imply any actual relationship or order between these entities or operations. Moreover, the term "comprising", "including" or any other variant is intended to cover non-exclusive inclusion, so that a process, method, item, or device that includes a series of elements not only includes those elements but also includes other elements that are not specifically listed, or even includes elements inherent to such a process, method, item, or device. Unless further restricted, the elements limited by the phrase "including a . . . " do not exclude the presence of the same elements in the process, method, item, or device that includes the element.

The above description of the disclosed embodiments enables those skilled in the art to implement or use this application. Various modifications to these embodiments will be apparent to those skilled in the art. The general principles defined herein can be implemented in other embodiments without departing from the spirit or scope of this application. Therefore, this application will not be limited to these embodiments herein, but will conform to the widest scope consistent with the principles and novel features disclosed herein.

The invention claimed is:

1. A method for erasing server data, applied to a server, comprising:
receiving a target data erasure strategy sent from a human-machine interaction device;
in response to the target data erasure strategy being a fast erasure strategy, erasing a specified type of data in a hard disk drive of a server to be processed; and
in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed;
in response to the target data erasure strategy being a delisting erasure strategy, erasing all the hard disk drive data in the server to be processed, and erasing the data other than the hard disk drive data of the server to be processed;
wherein the specified type of data further comprises header data and a file allocation table of a disk volume,
wherein the step of in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed further comprises:
  in response to the target data erasure strategy being the safe erasure strategy, determining whether the hard disk drive alarm exists in the server to be processed;
  in response to the hard disk drive alarm existing in the server to be processed, performing data erasure on the part of the hard disk drive of the server to be processed except the sector to be mapped, and erasing the data other than the hard disk drive data of the server to be processed; and
  in response to no hard disk drive alarm existing in the server to be processed, erasing all the hard disk drive data of the server to be processed, and erasing the data other than the hard disk drive data of the server to be processed.

2. The method for erasing server data according to claim 1, wherein after the step of in response to the target data erasure strategy being a fast erasure strategy, erasing a specified type of data in a hard disk drive of a server to be processed, the method for erasing server data further comprises:
  not deleting usage records and data for other hardware in the server to be processed.

3. The method for erasing server data according to claim 1, wherein the determining whether the hard disk drive alarm exists in the server to be processed further comprises:
  determining whether the hard disk drive alarm exists in the server to be processed by actively reading a register where hard disk drive alarm information is located.

4. The method for erasing server data according to claim 1, wherein the erasing the data other than the hard disk drive data of the server to be processed further comprises at least one of:
  deleting usage records of firmware in the server to be processed and deleting data in a persistent memory (PMEM).

5. The method for erasing server data according to claim 4, wherein the deleting usage records of firmware in the server to be processed and deleting data in a persistent memory (PMEM) further comprises at least one of:
  deleting the usage records of the firmware in the server to be processed by calling a firmware interface; and
  deleting data in the persistent memory (PMEM) in the server to be processed by means of a command line script.

6. The method for erasing server data according to claim 1, wherein the step of performing data erasure on the part of the hard disk drive of the server to be processed except the sector to be mapped, and erasing the data other than the hard disk drive data of the server to be processed, further comprises:
  counting starting and ending positions of all sectors to be mapped in the hard disk drive of the server to be processed;
  constructing an erasure isolation table of the sectors to be mapped according to the starting and ending positions counted;
  performing data erasure on sectors other than the sectors are in the erasure isolation table in the hard disk drive of the server to be processed; and
  erasing the data other than the hard disk drive data of the server to be processed.

7. The method for erasing server data according to claim 1, further comprising:
  during performing data erasure, controlling a prompter to prompt a current data erasure progress of the server to be processed.

8. The method for erasing server data according to claim 7, wherein the step of during performing data erasure, controlling a prompter to prompt a current data erasure progress of the server to be processed, further comprises:
  acquiring a total amount of all the data to be erased that is pre-calculated, calculating the amount of data that has been erased in real time, calculating a percentage progress of data erasure according to the total amount of all data to be erased and the amount of data that has been erased; and
  during performing data erasure, controlling the prompter to prompt the current percentage progress of data erasure of the server to be processed.

9. The method for erasing server data according to claim 1, wherein the erasing all the hard disk drive data in the server to be processed further comprises:
  invoking an array card tool to erase all the data on a hard disk drive connected to the array card; and
  erasing all the data of a hard disk drive directly connected to the server to be processed by overwriting a random number.

10. The method for erasing server data according to claim 9, wherein data erasure actions are performed for multiple times for both the hard disk drive connected to the array card and the hard disk drive directly connected to the server.

11. The method for erasing server data according to claim 1, wherein the step of in response to the target data erasure strategy being a fast erasure strategy, erasing a specified type of data in a hard disk drive of a server to be processed, further comprises:
  for the hard disk drive connected to an array card, deleting the header data and the file allocation table of the disk volume by using a rapid reorganization technology of the array card.

12. The method for erasing server data according to claim 1, wherein all data erasure strategies are stored in a memory card;
  wherein the memory card is fixed in a card slot on a mainboard of the server by means of plug-in mounting.

13. The method for erasing server data according to claim 12, wherein the memory card is embedded with a specified operating system;
  wherein the memory card is in a quiesced state when being not activated;
  the receiving a target data erasure strategy sent from a human-machine interaction device further comprises:
  in response to an instruction for activating the memory card, booting up the specified operating system in the memory card and executing the step of receiving the target data erasure strategy sent from the human-machine interaction device.

14. The method for erasing server data according to claim 12, further comprising:
  controlling the card slot where the memory card is located to be powered off in response to not receiving the instruction for activating the memory card; and
  controlling the card slot where the memory card is located to be powered on in response to receiving the instruction for activating the memory card.

15. A device for erasing server data, comprising:
  a memory configured for storing a computer program; and
  a processor configured for executing the computer program to implement operations of:

receiving a target data erasure strategy sent from a human-machine interaction device;

in response to the target data erasure strategy being a fast erasure strategy, erasing a specified type of data in a hard disk drive of a server to be processed; and in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed;

wherein the specified type of data further comprises header data and a file allocation table of a disk volume.

16. The device for erasing server data according to claim 15, wherein the processor is further configured for:

in response to the target data erasure strategy being a delisting erasure strategy, erasing all the hard disk drive data in the server to be processed, and erasing the data other than the hard disk drive data of the server to be processed.

17. The device for erasing server data according to claim 15, wherein the processor is further configured for:

after the step of in response to the target data erasure strategy being a fast erasure strategy, erasing a specified type of data in a hard disk drive of a server to be processed, not deleting usage records and data for other hardware in the server to be processed.

18. A non-transient computer readable storage medium storing a computer program that, when executed by a processor, implements operations of:

receiving a target data erasure strategy sent from a human-machine interaction device;

in response to the target data erasure strategy being a fast erasure strategy, erasing a specified type of data in a hard disk drive of a server to be processed; and in response to the target data erasure strategy being a safe erasure strategy and a hard disk drive alarm existing in the server to be processed, performing data erasure on a part of the hard disk drive of the server to be processed except a sector to be mapped, and erasing data other than hard disk drive data of the server to be processed;

wherein the specified type of data further comprises header data and a file allocation table of a disk volume.

\* \* \* \* \*